April 4, 1950 W. G. GEORGIOU 2,503,038
REGULATING GAS BURNER
Filed April 26, 1946 2 Sheets-Sheet 1
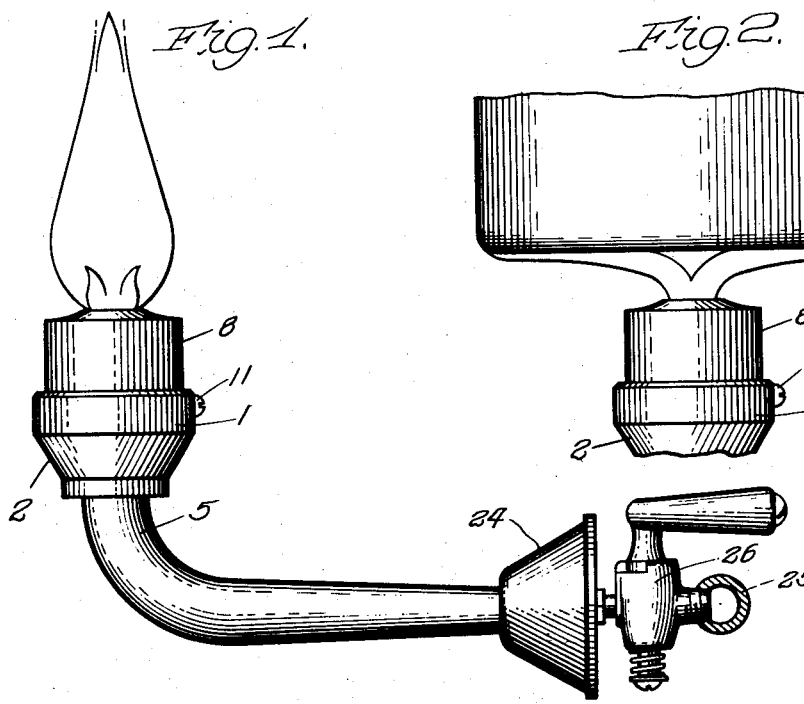
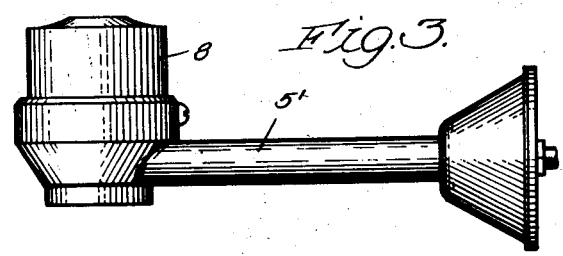
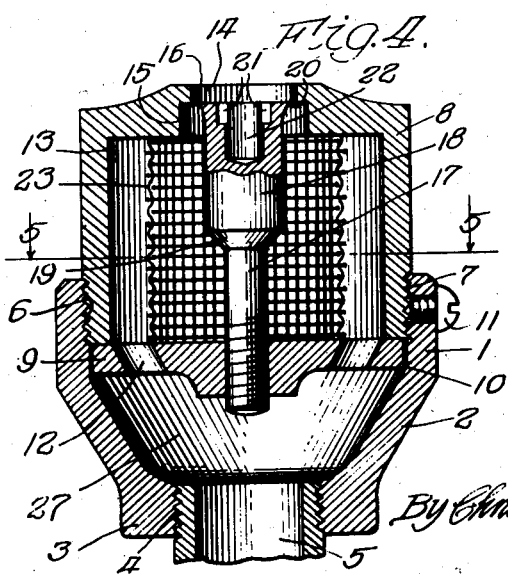
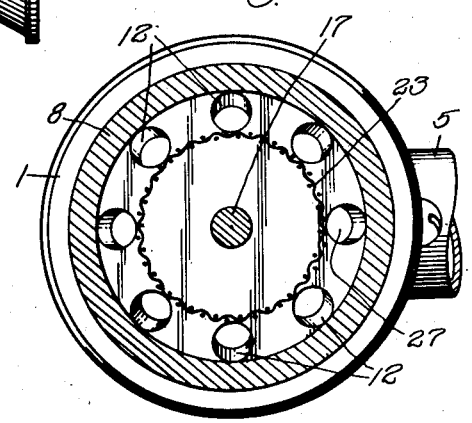
Inventor:
William G. Georgiou, April 4, 1950 W. G. GEORGIOU 2,503,038
REGULATING GAS BURNER
Filed April 26, 1946 2 Sheets-Sheet 2

Inventor:
William G. Georgiou,
By Christy Schroeder, Merriam, Hofgren,
Attys.

Patented Apr. 4, 1950

2,503,038

UNITED STATES PATENT OFFICE 2,503,038

REGULATING GAS BURNER

William G. Georgiou, Chicago, Ill.

Application April 26, 1946, Serial No. 665,100

12 Claims. (Cl. 158—117)

This invention relates generally to a gas burner and more particularly to a gas burner of novel and improved construction, which in operation produces an action resulting in greater thermal efficiency and more nearly perfect combustion.

Used singly, and by combining multiples of this unit in suitable asemblies, I have provided burners with heating areas suitable for use in top burners and ovens in domestic ranges, restaurant ranges, baking ovens for industrial use, for glue pots, solder pots, heat treating, drying japanning and various other processing requiring heat. Impartial tests have been made which established the efficiency of my burner as better than 50% higher than is required by the American Gas Association standards for burners in current use, and which further showed only inappreciable trace of carbon monoxide due to improved combustion.

Among the objects of my invention are: to provide a novel and improved gas burner; to provide a gas burner having greater thermal efficiency, more nearly perfectly combustion, and which produces only an inappreciable trace of carbon monoxide; to provide a gas burner in which the mixture of gas and air is directed laterally through a curved screen against a cylindrical stem to give a turbulent action to the mixture which is given a further turbulence as it passes through a novel construction of orifice where combustion takes place; to provide a novel combination of screen, stem and orifice; to provide a novel assembly of burners, each having a curved screen, a stem and orifice; and to provide a novel adjustable stem in combination with a curved screen and orifice, for giving an improved action to the flame.

Other objects and advantages will become readily apparent from the following detailed description taken in connection with the accompanying drawings wherein:

Fig. 1 is a side elevation of a single gas burner embodying my invention.

Fig. 2 is a fragmentary side elevation of the upper portion of the burner and showing a flat bottom vessel positioned thereabove.

Fig. 3 is a side elevation of the burner of Fig. 1, but showing it mounted upon a modified form of gas tube.

Fig. 4 is an enlarged vertical section on a median plane of the burner of the preceding figures, but showing only a fragment of the gas tube for conducting the gas-air mixture thereto.

Fig. 5 is a transverse section on the line 5—5 of Fig. 4.

Figure 6:
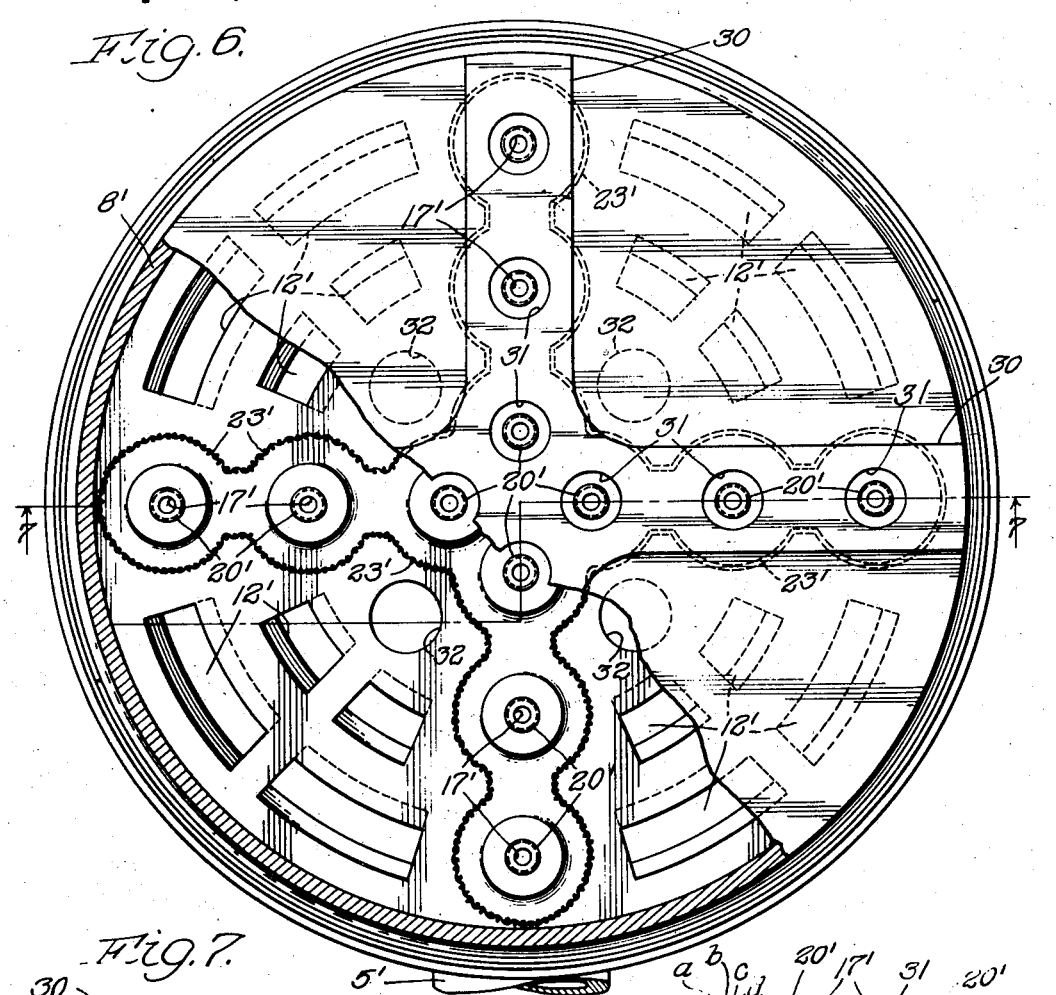
Fig. 6 is a top plan view, partly broken away, of a multiple unit of gas burners embodying my invention.

While my invention further resides in the combination, construction and arrangement of parts illustrated in the accompanying drawings, I have shown therein for illustrative purposes only, preferred embodiments, and wish it understood that the same are susceptible of modification and change without departing from the spirit and scope of the appended claims.

In Figs. 1-5 I have shown my invention as applied to a single gas burner comprising a cup-like member 1 having inclined sides 2 and a bottom 3 formed with a threaded hole 4 within which is threadably mounted a gas tube 5. Member 1 at its upper end is formed with interior threads 6 to threadably receive complemental threads 7 formed on the exterior of the lower portion of a casing member 8. Slidably mounted within the larger inside diameter of cup-like member 1 is a plate 9 which rests at its bottom peripheral edge upon the shoulder 10 against which it is clamped when the bottom edge of casing member 8 is screwed down against the upper face of plate 9. Set screw 11 firmly holds these parts together when assembled as described above. Plate 9 is formed with a plurality of annularly arranged holes 12 extending at an angle upwardly and outwardly so as to direct gas-air mixture against the inner face of the side walls 13 of the casing member 8.

The top of casing member 8 is formed with a central opening 14 below which is a counterbore 15 forming a shoulder 16 therebetween. Threadably mounted in plate 9 is an upstanding stem 17, the upper portion 18 of which is of enlarged diameter with a bevelled shoulder 19 interposed between these parts. The upper end of stem 17—18 is outwardly flared at 20 to provide around its periphery an edge that is of slightly smaller diameter than opening 14. As stem 17—18 is adjusted up or down by virtue of its threaded connection with plate 9, the annular space between the flared edge 20 and shoulder 16 of opening 14 will be adjusted to a larger or smaller size as desired, depending upon the direction of rotation of the stem. To facilitate such rotation the stem is provided with slots 21 extending outwardly from diametrically opposite sides of the top of hole 22 in the top of the stem. If desired hole 22 may be omitted and the slot be formed directly in the body of the stem. A screw driver or other suitable tool may be inserted in slots 21 for adjusting the stem upwardly or downwardly by rotation in the desired direction.

Prior to assembling of casing member 8 upon the cuplike member 1, a cylindrical wire screen 23 will be placed in upright position upon plate 9 just within the annular row of holes 12 and concentric with the stem 17—18. This screen will be clamped between plate 9 and the inner surface of the top of casing member 8 when these parts are assembled, and the screen may be soldered or otherwise secured to one or the other of these parts if desired. The screen is positioned outside of the counterbore opening 15, and is preferably of a fine mesh.

Gas tube 5, in the form shown in Fig. 1 is curved to exend in decreasing cross section to the air inlet chamber member 24 having the usual adjustable air inlet means for admitting atmospheric air to the interior of the tube 5 to mix therein with gas under pressure from the gas line 25 controlled by a conventional valve 26. In the form shown in Fig. 3 the structure is in general the same as in Fig. 1 except that the gas tube 5' is not flared outwardly toward the burner casing as in Fig. 1, but is of uniform cross section, for the greater portion of its length, and at its outer end is widened and provided with an opening to receive the inclined sides 2 of the cup-like member of the burner. Suitable connection is made (not shown) between the passageway in tube 5' and the space 27 in the cup-like member 2 below plate 9.

Figure 7:
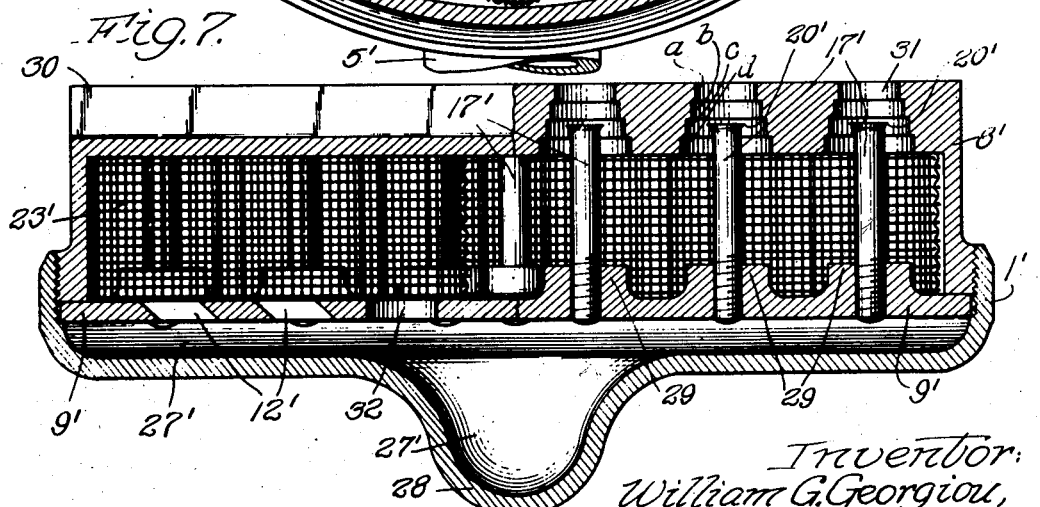
Fig. 7 is a vertical section on the line 7—7 of Fig. 6.

In the form shown in Figs. 6 and 7 I have provided a multiple unit having a plurality of burners each formed in general like that shown in Fig. 4 except that the wire screen 23' is extended to encompass all of the burners and divide the space outside of the screen from that within the screen. Reference numerals similar to those used in Fig. 4 are used in Figs. 6 and 7, except to add a prime to such numerals in Figs. 6 and 7 for such parts as are in common with those of the form of Fig. 4. As will be noted in Figs. 6 and 7 the casing 8' is of larger diameter and provided with a bottom plate 9' removably secured in place in the same manner as that shown in Fig. 4. Below plate 9' is a space 27' having a depression 28 for connection at one end with a gas tube 5'. Plate 9' is formed with two rows of spaced apart hub portions 29, these two rows being arranged on diameters at right angles to each other as shown in Fig. 6. Upstanding from each hub portion is a stem 17' similar to stem 17 in Fig. 4 except for being of a uniform diameter. Stems 17' are each threaded through hub portions 29 so that rotation of the stem will move it axially. The upper free end of each of stems 17' is formed with an outwardly flared marginal edge 20', for a purpose similar to flanges 20 in Fig. 4.

The top cover of casing 8' is formed with four upstanding ridges 30 at right angles to each other, through which ridges are formed a plurality of stepped openings a, b, c and d, the upper one of which corresponds to opening 14 in Fig. 4, and the next one of which corresponds to opening 15 in Fig. 4. These stepped openings provide a plurality of shoulders 31, which in conjunction with the flared edges 20' on the free end of the stems 17', add further to the turbulence of the gas-air mixture emerging through the orifice thus created. The size of this orifice can be increased or decreased in accordance with the longitudinal adjustment of the respective stems, depending upon the direction of rotation thereof.

Bottom plate 9' is formed with a plurality of series of inclined openings 12' similar in purpose to openings 12 in Fig. 4. The gas-air mixture passing upwardly through the outer row of openings 12' will be directed against the side walls of the casing and there deflected inwardly to and through the screen 23'. The gas-air mixture passing upwardly through the inner row of openings 12' will be picked up by the inwardly flowing streams from the outer row of openings and carried to and through the screen 23'. These gas-air mixtures will pass through the screen and forcibly strike the cylindrical sides of the stems and be given turbulence which will be increased as the mixture passes upward through the orifices. This produces a flame of improved action. Additional openings 32 may be formed in plate 9' outside of screen 23' if desired. Those portions of the screen on opposite sides of the stems are formed with an outwardly extending cylindrical curvature for a portion of their length. At each end of the cross rows of stems the screen is cylindrically curved around the end stems and then back on the other side. This gives a continuous screen around the stems with the stems within the screen and the inclined openings 12' outside of the screen.

From the above it is seen that I have provided a novel burner, of either the single unit or multiple unit type (which latter may have any desired number of burner flames), in which the gas-air mixture is forced inwardly through a screen and against a cylindrical stem which cause it to have an effective turbulence, and then out through a novel orifice to form a flame having a greatly improved action.

I claim:

1. A gas burner comprising a hollow casing having circular side walls and a pair of end walls, forming an interior chamber one of said end walls having an opening extending therethrough, a stem of cylindrical cross section passing centrally through the chamber and having a free end positioned in said opening and of smaller diameter than the opening, a cylindrical wire screen concentric with the stem, spaced therefrom and touching said end walls to form an annular space between the outside face of the screen and the inside face of the side walls, and means for conducting gas under pressure to said annular space, whereby the gas will pass through the screen, strike the cylindrical walls of the stem and be forced through the orifice between the end edges of the stem and the walls of the end wall opening to produce a flame having turbulence and thorough combustion.

2. A gas burner as claimed in claim 1, in which the free end of the stem is axially adjustable with relation to the end wall opening and said free end is formed with an outwardly flared marginal edge.

3. A gas burner as claimed in claim 1, in which said means comprises the end wall opposite from the one having said opening and being formed with a plurality of inclined annularly spaced holes leading to the annular space outside of the screen, the inclination of said inclined holes being toward the inner face of said side walls, whereby a gas-air mixture being passed under pressure through the inclined holes will strike said inner face and be deflected toward and through the screen and strike the stem.

4. A gas burner comprising a casing having cylindrical side walls and end walls to form an interior chamber, an adjustable stem in said chamber and having a free end, a cylindrical wire screen surrounding the stem and laterally spaced from the stem and the side walls, said casing having in one end wall an opening concentric with said free end which extends thereinto, said opening increasing in size toward the chamber, said screen at its ends contacting and being supported by said end walls, the end wall opposite the one having said concentric opening being formed with a plurality of holes therein opening into the space between the screen and the side walls, and means for introducing a gas-air mixture through said holes.

5. A gas burner comprising a hollow casing having a cylindrical side wall, a top wall, and an apertured bottom member extending across the bottom of the side wall, to form an interior chamber above said bottom member, a stem mounted in said bottom member and extending concentrically upwardly in said chamber, a cylindrical wire screen concentric with said stem and radially spaced outwardly from the stem and inwardly from the inner surface of the side wall, said screen having its bottom end contacting said bottom member and its top end contacting said top wall and stationarily held therebetween, the aperture in the top wall being concentric with the stem and of larger diameter than the top of the stem, said bottom member having apertures in that portion below the space between the screen and the side wall, the upper end of the stem being located adjacent said aperture in the top wall, whereby gas will pass through said last mentioned apertures into the space between the screen and the side wall, then through said screen and against the stem and then out through the space between the top of the stem and the edge wall forming the aperture in the top wall.

6. A gas burner as claimed in claim 5, in which the top of said stem is axially adjustable with relation to the aperture in the top wall.

7. A gas burner as claimed in claim 6, in which said aperture in the top wall is of larger diameter at the inner face of the top wall than at the outer face thereof.

8. A gas burner as claimed in claim 7, in which the top end of the stem is formed with an outwardly flared marginal edge.

9. A gas burner comprising a hollow casing having side walls, a top wall having an opening, and a bottom plate, to form an interior chamber, a stem mounted in the bottom plate and extending upwardly in the chamber with its top end of smaller diameter than the top wall opening and positioned substantially therein, means for axially adjusting said stem top end, a curved closed screen extending entirely around the sides of the stem and having its ends in contact with the top wall and bottom plate, said screen being positioned in said chamber between the stem and side walls and laterally spaced from both thereof, said bottom plate below the space between the side walls and the screen having a plurality of holes therethrough, a hollow member extending below said bottom plate and having an inner space in communication with the holes in the bottom plate, a tube for leading gas to said space below the bottom plate, whereby said gas will pass through the holes in the bottom plate into the space between the walls and the screen, through the screen and against the stem, then through the space between the top of the stem and the edges of the opening in the top wall.

10. A gas burner comprising a casing having closed curved side walls and top and bottom walls to form an interior chamber above said bottom wall, an upstanding stem mounted in the bottom wall, a wire screen tube spaced from said stem and from the side walls, said top wall being formed with an opening concentric with the stem and of larger diameter than the top of the stem to provide an annular space therebetween for gas to pass therethrough, said bottom wall having a plurality of upwardly extending holes therethrough between the screen tube and the side walls, said screen tube being coaxial with the stem and at its ends contacting the top wall outside of said opening therein and the bottom wall inside of said plurality of holes therein.

11. A gas burner as claimed in claim 10, including means for axially adjusting the top end of the stem with relation to the opening in the top wall.

12. A gas burner as claimed in claim 10, in which said opening in the top wall of the casing has an outwardly and downwardly extending offset adjacent the top of the stem, the top outer edge of the stem being outwardly flared with relation to the top wall opening and its offset.

WILLIAM G. GEORGIOU.

REFERENCES CITED

The following references are of record in the file of this patent:

UNITED STATES PATENTS

| Number | Name | Date |
| --- | --- | --- |
| 747,312 | Axtell | Dec. 15, 1903 |
| 1,174,263 | Maul | Mar. 7, 1916 |
| 1,843,361 | Hageman | Feb. 2, 1932 |
| 2,001,739 | MacGregor | May 21, 1935 |